3,156,254
LIQUID SEAL GAS CUT-OFF VALVES
Hubert G. Stallkamp, Akron, and Edwin Durham, Wadsworth, Ohio, assignors to The Babcock & Wilcox Company, New York, N.Y., a corporation of New Jersey
Filed May 10, 1961, Ser. No. 109,073
3 Claims. (Cl. 137—253)

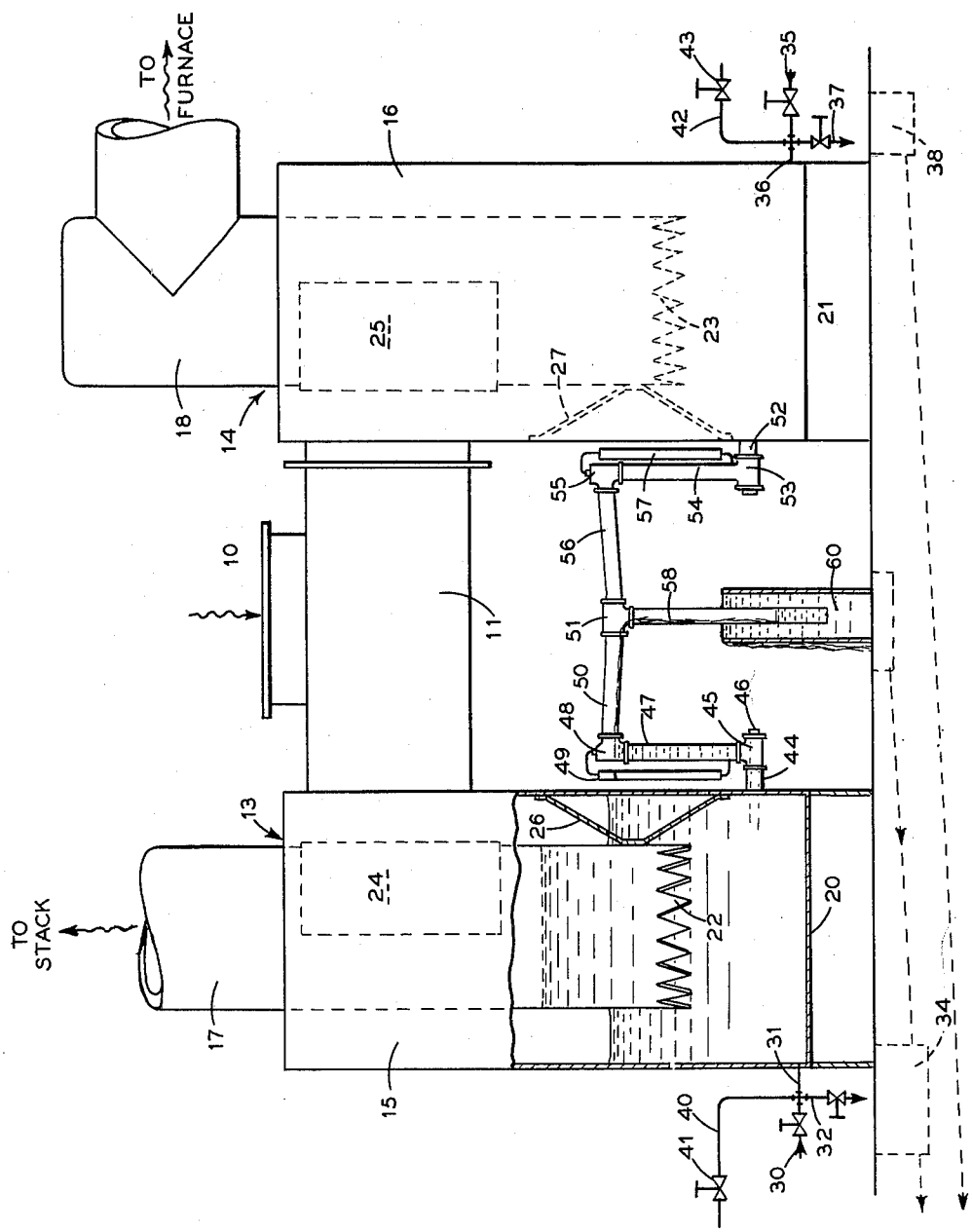

The present invention relates to positive closing valves of the liquid sealing type, and more particularly to valves for selectively directing a hot gas stream containing a toxic material through alternative flow paths.

The invention is directed to an improvement in the construction and operation of water sealing valves where a hot gas containing combustibles, such as, for example, carbon-monoxide, may be burned for heat recovery purposes and to consume the combustible materials therein. Such hot gases may be obtained from a catalyst regenerative kiln where the gases may be at a temperature of the order of 1,000 F., a pressure of one pound gage and contains carbon-monoxide. When such gases are burned in a furnace in conjunction with a high heat value fuel, and passed over heat recovery surfaces such as vapor generating surfaces, it is absolutely essential that the gas flow be prohibited from entering the furnace whenever access to the furnace or the heat exchange surfaces becomes necessary. In installations of this type which involve a continuously operating process, the shut-down of the furnace or vapor generator for maintenance and repair necessitates that the hot gases from the regenerator kiln must be diverted from the heat exchange apparatus and pass directly to the stack. The valve to accomplish this must be completely effective so there will be no leakage of carbon-monoxide containing gas to the unit since inhalation of such gases could be fatal to the operators during maintenance work within the heat recovery apparatus.

In accordance with the present invention, a pair of tanks are positioned in spaced side-by-side relationship with a common inlet connection for the introduction of the hot gases thereto. Each tank is provided with an elongated duct which extends through the top of the tank to a position spaced above the bottom of the tank. The duct in each tank provides a discharge means for the movement of the gases through the tank entering the tank at its upper portion and discharging into an annular space formed between the walls of the tank and the discharge duct, first flowing downward in the annular space and then upward to discharge through the duct. When it is desired to prevent the flow of gas through one of the tanks, water is introduced into the tank, submerging the lower end of its discharge duct and thereby providing an effective valved seal against flow of gases through the particular tank.

Since either one or the other of the tanks will always be serving as a cut-off valve during operation, it is necessary to arrange the tanks with provision for adding makeup water to compensate for water evaporated by the hot gases, otherwise the effectiveness of the water seal will be impaired and the seal useless. Mere compensation for evaporation surprisingly has been found inadequate to overcome a corrosive water condition arising from the absorption of contaminants from the gases. Gas eddy currents set up in the seal tank apparently have been responsible for the creation of this condition. The rate of makeup flow therefore should be such as to provide both for evaporation at the gas-water level interface as well as for continuous overflow of seal water.

In the present invention, this is accomplished by the use of an external standpipe on each tank, the lower end of which is connected to the tank at a point below the open end of the gas discharge duct. The upper end of the standpipe on each valve is connected with a horizontally disposed pipe that interconnects the upper end portions of the standpipes of both valves. The connecting pipe is positioned at a level above the lower end of the gas outlet duct so as to provide a sufficient volume of water in the tank to effect the necessary seal. The connecting pipe is provided with a common depending overflow pipe which extends downwardly into a liquid seal. Advantageously, the standpipes on each of the valves is provided with a gage glass which gives an indication of the liquid level in each tank and can be used as an indicator for regulating the rate of flow to or from the tank.

The various features of novelty which characterize our invention are pointed out with particularity in the claims annexed to and forming a part of this specification. For a better understanding of the invention, its operating advantages and specific objects attained by its use, reference should be had to the accompanying drawings and descriptive matter in which we have illustrated and described a preferred embodiment of the invention.

Of the drawing:

In the single figure a pair of water sealing valves is provided including the overflow and sealing arrangement of the present invention.

In the illustrated embodiment of the invention, a pair of horizontally spaced closed tanks is provided to form a pair of sealing valves for directing the flow of hot carbon-monoxide containing waste gases from an exterior source such as a catalyst regenerator kiln. It will be understood that the valve of the type here described may be utilized for controlling the direction of flow of any gas through preferred flow paths, and that the hot gases, with or without toxic contaminants, may be obtained from a source other than that indicated.

As shown in the drawing, the gases are delivered through a duct 10 which discharges into a horizontally disposed duct 11 opening at its opposite ends to the valves 13 and 14. Each valve, defined by upright cylindrical walls 15 and 16 respectively, forming a tank-like container, is provided with outlet ducts 17 and 18, respectively. Each outlet duct is coaxial with respect to its respective valve 13, 14 and has an outside diameter less than that of the walls 15 and 16. Each duct 17 or 18 extends downwardly through a major portion of its respective valve 13 or 14 to a position spaced above the bottom closure plate 20 or 21, respectively. As shown, each of the gas outlet ducts 17 and 18 is provided with a serrated lower end 22 and 23 respectively and additionally is provided with a reinforcing wear saddle 24 and 25, respectively, mounted on the exterior wall thereof diametrically opposite the inlet from the duct 11. Advantageously, each of the outlet ducts 17 and 18 is provided with an internal centering brace 26 and 27 for proper alignment of the duct with respect to the surrounding walls 15 and 16, respectively. The outlet duct from each of the tanks is provided with an extension, one of which will be connected with a furnace while the other is connected to a stack (neither shown) as required.

In the apparatus so far described, it will be noted the hot gases passing through the duct 10 from, for example, a catalyst regenerator kiln, may be passed through the duct 11 into either valve 13 or valve 14 depending upon the level or height of the water seal in the valves 13 or 14. In the embodiment shown, the valve 13 is filled with sufficient water to cut-off flow of hot gases from the duct 10 through the discharge duct 17. However, the valve 14 is open so that the gases will move from the duct 10 through the valve 14 and into the discharge duct 18.

As has hereinbefore been suggested, one useful application for the present invention is in connection with the recovery of the sensible heat and the combustible heat values contained in the gases discharged from a catalyst regenerator kiln. Under such circumstances, the duct 18 would be connected with a furnace for the combustion of the CO containing gases. The gases discharged from such a furnace, containing both combustible and sensible heat values would thereafter be passed over heat exchange surfaces for the generation of steam, for example. A furnace with heat exchange apparatus of the type described is illustrated in U.S. Patent 2,840,049.

When operated for the purposes described, the valve arrangement with valve 13 closed and valve 14 opened, such as illustrated in the drawing, could be maintained in this relationship for weeks at a time. Under these circumstances, eddy currents of hot gases would circulate in the annulus within the valve 13 and would tend to evaporate the water maintaining the seal therein. Moreover, the contact between the gases and the water at their interface would tend to cause condensation of corrosive materials from the gas and its absorption into the water. The tendency therefore would be to create a corrosive condition in the water in the lower portion of the valve 13 to the detriment of the metallic walls 15. It will, of course, be understood that evaporation of the sealing water cannot be tolerated since the water level in the valve 13 must be maintained substantially uniform to provide the sealing effect of the valve. In the present invention, means are provided for maintaining the requisite water level in the valve and at the same time for replenishing the sealing water at a rate which will avoid the creation of corrosive conditions in the valve.

As shown in the drawing, water is supplied to the lower portion of the valve 13 through a valved inlet pipe 30 which is arranged with sufficient cross-sectional flow area to permit rapid filling of the valve when it is intended to be used to cut-off flow of gases therethrough. For discharge of water from the valve, the pipe 31 connecting pipe 30 and the valve is connected with a discharge pipe 32 of cross-sectional flow dimensions to permit rapid discharge of water. Pipe 32 is likewise provided with a gate valve or the equivalent so that flow of water therethrough may be regulated for discharge to a sump 34.

The valve 14 is similarly provided with an inlet valved pipe 35, pipe 36 and discharge line 37. The discharge from valve 14 through pipe 37 is to a sump 38 which may be connected to a common water disposal pit or sewer such as indicated on the drawing.

The valved water inlet pipes 30 and 35 are intended to have a sufficient flow volume to submerge the serrated edges 22 and 23 of the discharge ducts 17 and 18, respectively, at a high rate so as to quickly and positively actuate either valve. The serrated edges on the discharge ducts 17 and 18 are intended to reduce water carryover through the discharge ducts during the filling of the valves 13 and 14.

The valve 13 is additionally provided with a relatively small diameter make-up water flow pipe 40, with the flow therethrough regulated by the valve 41 for the continuous flow of make-up water into the valve 13, and with the capacity of this line somewhat in excess of the evaporating rate of water from the closed valve 13. The valve 14 is similarly provided with a make-up water pipe 42 and a valve 43 for regulation of make-up water flow to the valve 14 when such is required.

The flow of make-up water to each of the valves 13 and 14, when in use for gas cut-off purposes, necessitates the provision of an overflow pipe to dispose of the excess water. As shown, the overflow pipe arrangement consists of a horizontally disposed section of pipe 44 connected with a T fitting 45. The pipe 44 is located intermediate the bottom plate 20 and the serrated edge 22 of the outlet duct 17. The T connection 45 is provided with a plug 46 opposite the pipe 44 connection and an upstanding pipe section or standpipe 47. The upper end of the standpipe 47 is likewise provided with a T fitting 48 with the side outlet therefrom opening to a generally horizontally disposed pipe section 50 which is connected with a T fitting 51 intermediate the horizontal spacing between the valves 13 and 14.

The upper end of the T fititng 48 is provided with a reducer and an inverted U-shaped connection to a gage glass 49. The gage glass 52 is connected at its lower end to the pipe 47 upwardly adjacent the T fitting 45. With the arrangement described, the gage glass 49 will give a true indication of the water level in the valve 13. Moreover, due to its location and connection with the standpipe 47, the gage glass will tend to remain clean for easy reading.

The valve 14 is similarly provided with pipe 52, a T fitting 53, standpipe 54, upper T fitting 55 and a generally horizontally disposed pipe 56 connected to the T fitting 51 opposite the pipe 50 of valve 13. It is also of advantage to provide a gage glass 57 for the standpipe 54 where the gage glass is connected to opposite end portions of the standpipe as described in connection with the gage glass for valve 13. The T fitting 51 is also provided with a depending pipe 58 which has its lower end submerged in a water seal 60.

In the operation of the overflow system described, the make-up water introduced through the pipe 40 in connection 31, for example, maintains the level of sealing water in the valve 13. Excess water will pass through the standpipe 47 and pipe 50 for discharge through the depending pipe 58. Any gases or non-condensible vapors entrained with the water passing through the pipe 50 will discharge into the valve 14 by way of the flow path including pipe 56 and standpipe 54. Thus, any such gases or vapors vented from the valve 13 through the overflow system will not be discharged to the atmosphere but will mingle with the gases passing through the valve 14 toward the furnace (not shown).

While in accordance with the provisions of the statutes we have illustrated and described herein the best form and mode of operation of the invention now known to us, those skilled in the art will understand that changes may be made in the form of the apparatus disclosed without departing from the spirit of the invention covered by our claims, and that certain features of our invention may sometimes be used to advantage without a corresponding use of other features.

What is claimed is:

1. Water sealing valve apparatus for the selective flow of hot gases from a common source to points of use comprising walls forming a pair of spaced upwardly elongated tanks each having a gas discharge duct with a lower open end spaced above the bottom of the tank, a gas inlet opening into the upper portion of each tank, means for directing flow of gases to both of said inlet openings from a common duct, means including valved pipes for separately charging water directly to each of said tanks to submerge the lower open end of each of the respective gas discharge ducts and to thereby stop flow of gases therethrough, means for discharging water from each of said tanks for flow of gas therethrough, and means for maintaining a continuous flow of water through one of said valved pipes for overflow of water from said tank only when water is in said tank for gas flow sealing purposes.

2. Water sealing valve apparatus for the selective flow of hot gases from a common source to points of use comprising walls forming a pair of spaced upwardly elongated tanks each having a gas discharge duct with a lower open end spaced above the bottom of the tank, a gas inlet opening into the upper portion of each tank, means for directing flow of gases to both of said inlet openings from a common duct, means including valved pipes for separately charging water directly to each of said tanks to selectively submerge the lower open end of each of the respective gas discharge ducts and to thereby stop flow of gases therethrough, means for maintaining a substantially uniform level of sealing water in said tanks including an overflow pipe means common to both of said tanks having a common water sealed overflow water discharge pipe, means for discharging water from one of said tanks for selective flow of gas therethrough, and means for maintaining a continus flow of water through one of said valved pipes for overflow of water through said overflow pipe from said tank only when water is in said tank for gas flow sealing purposes.

3. Water sealing valve apparatus for the selective flow of hot gases from a common source to points of use comprising walls forming a pair of spaced upwardly elongated tanks each having a gas discharge duct with a lower open end spaced above the bottom of the tank, a gas inlet opening into the upper portion of each tank, means for directing flow of gases to both of said inlet openings from a common duct, means including valved pipes for separately charging water directly to each of said tanks to selectively submerge the lower open end of each of the respective gas discharge ducts and to thereby stop flow of gases therethrough, means for discharging water from the other of said tanks for flow of gas therethrough, and means for maintaining a continually replenished body of water in a tank when the tank is provided with a gas sealing body of water including a standpipe positioned adjacent the lower portion of each of said tanks, a pipe opening from the lower end of each of said standpipes to the lower portion of each of said tanks below the normal sealing water level therein, a pipe interconnecting the upper ends of said standpipes above the normal sealing water level within said valves, an overflow pipe extending downwardly from and opening in said interconnecting pipe and having its lower end submerged in a liquid seal, and means for continuously adding water directly to said tank containing sealing water to maintain overflow through said standpipe with the excess water discharging through said overflow pipe and simultaneously venting entrained gases through the other standpipe into said other tank.

References Cited in the file of this patent

UNITED STATES PATENTS

| | | |
|---|---|---|
| 927,794 | Harvey | July 13, 1909 |
| 1,609,525 | Moldenhaver | Dec. 7, 1926 |
| 2,149,393 | Foresman | Mar. 7, 1939 |
| 2,199,728 | Overson | May 7, 1940 |
| 2,891,607 | Webster | June 23, 1959 |